US011660933B2

(12) United States Patent
Camella et al.

(10) Patent No.: US 11,660,933 B2
(45) Date of Patent: May 30, 2023

(54) EXHAUSTER ASSEMBLY FOR A VEHICLE

(71) Applicant: Motus Integrated Technologies, Holland, MI (US)

(72) Inventors: Michael James Camella, Huron, OH (US); John Joseph Todd, II, Farmington Hills, MI (US)

(73) Assignee: Motus Integrated Technologies, Holland, MI (US)

( * ) Notice: Subject to any disclaimer, the term of this patent is extended or adjusted under 35 U.S.C. 154(b) by 299 days.

(21) Appl. No.: 16/987,629

(22) Filed: Aug. 7, 2020

(65) Prior Publication Data

US 2022/0042430 A1 Feb. 10, 2022

(51) Int. Cl.
*B60H 1/00* (2006.01)
*B60H 1/24* (2006.01)
*F01N 1/06* (2006.01)
*F01N 13/18* (2010.01)

(52) U.S. Cl.
CPC ............... *B60H 1/249* (2013.01); *F01N 1/06* (2013.01); *F01N 13/1805* (2013.01); *F01N 13/1855* (2013.01)

(58) Field of Classification Search
CPC ............................... B60H 1/248; B60H 1/249
USPC .................................................. 454/70, 162
See application file for complete search history.

(56) References Cited

U.S. PATENT DOCUMENTS

| 7,517,280 | B2 * | 4/2009 | McConnell | ............ | B60H 1/249 |
| | | | | | 454/162 |
| 2012/0238200 | A1 * | 9/2012 | Berkovitz | ............ | F24F 13/082 |
| | | | | | 454/367 |
| 2014/0057543 | A1 * | 2/2014 | Kim | ........................ | B60H 1/249 |
| | | | | | 454/165 |
| 2014/0170962 | A1 * | 6/2014 | Carter | ................... | F24F 13/082 |
| | | | | | 454/367 |
| 2015/0354127 | A1 * | 12/2015 | Ott | .......................... | D06F 58/20 |
| | | | | | 34/235 |
| 2017/0282688 | A1 * | 10/2017 | Mohany | ................. | B60H 1/249 |
| 2019/0054803 | A1 * | 2/2019 | Carlson | ................. | B60H 1/249 |
| 2019/0070934 | A1 * | 3/2019 | Carlson | ................... | F24F 13/14 |
| 2019/0105967 | A1 * | 4/2019 | Huet | ....................... | B60H 1/249 |
| 2020/0086716 | A1 * | 3/2020 | Carlson | ................. | B60H 1/248 |
| 2020/0189359 | A1 * | 6/2020 | Barnes | ................... | B60H 1/249 |
| 2020/0317028 | A1 * | 10/2020 | Shaw | ................... | B60R 13/0237 |

OTHER PUBLICATIONS

MoparPartsInc.com, Exhauster.Bodyside Aperture, 2014, 8 pgs. https://www.moparpartsinc.com/p/Ram_2014_/EXHAUSTER-BODYSIDE-APERTURE/78277946/68324094AB.html.

* cited by examiner

*Primary Examiner* — Ko-Wei Lin

(74) *Attorney, Agent, or Firm* — Fletcher Yoder, P.C.

(57) ABSTRACT

A mounting assembly for a silencer of an exhauster assembly includes a mounting plate. The mounting plate has an opening configured to receive an exhauster of the exhauster assembly while the exhauster is coupled to a structure of a vehicle at least partially separately from the mounting plate. In addition, the mounting plate has a first side configured to face the structure of the vehicle and a second side configured to face the silencer. The mounting assembly also includes at least one exhauster mounting feature configured to couple the mounting plate to the exhauster. Furthermore, the mounting assembly includes a silencer mounting feature configured to couple the silencer to the mounting plate.

19 Claims, 6 Drawing Sheets

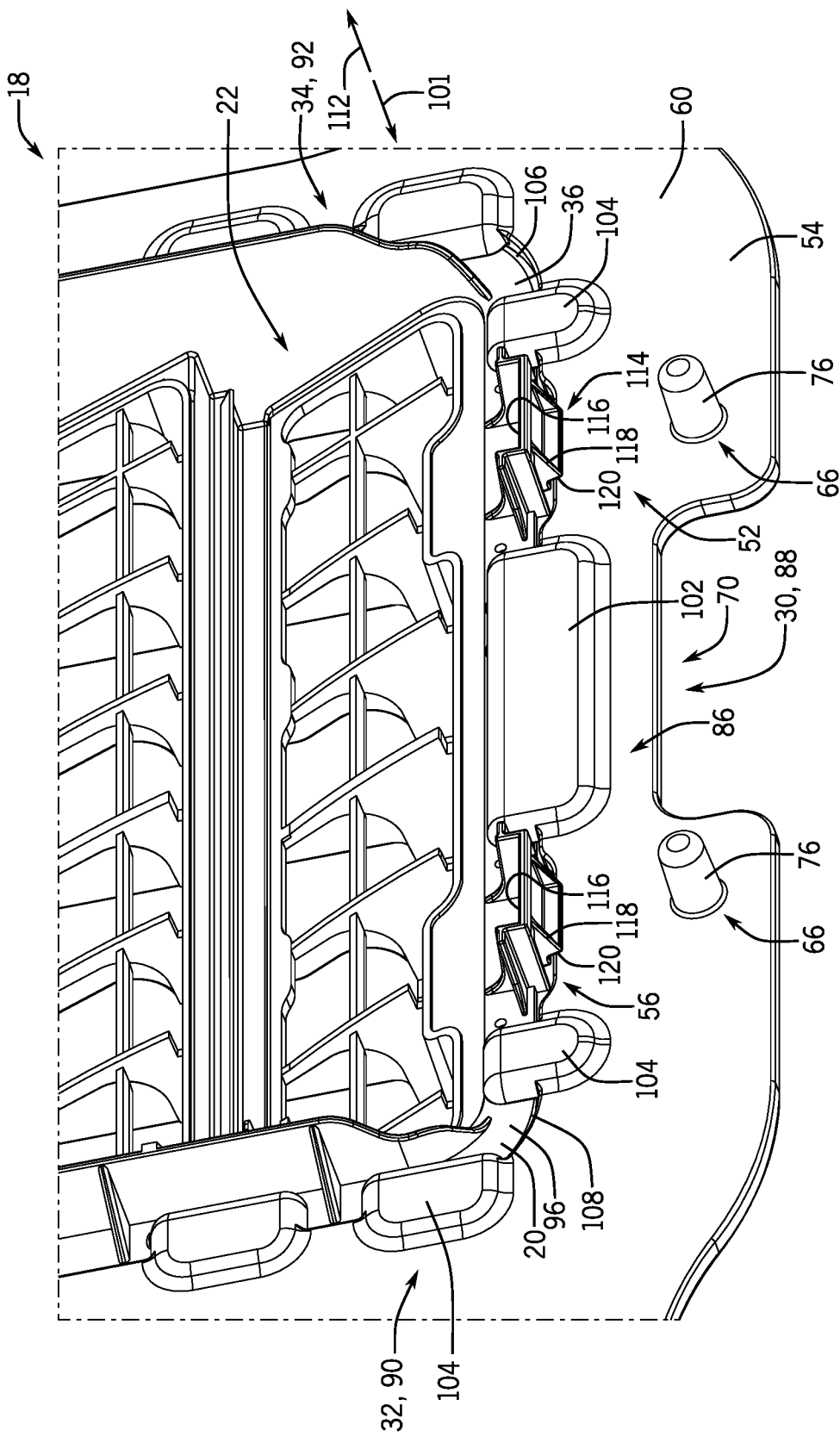

EXHAUSTER ASSEMBLY FOR A VEHICLE

BACKGROUND

The present disclosure relates generally to an exhauster assembly for a vehicle.

Certain vehicles include an exhauster configured to enable air within the interior of the vehicle to exhaust to the atmosphere. The exhauster generally includes a valve configured to open while the pressure within the interior of the vehicle exceeds the atmospheric pressure, thereby facilitating airflow from the vehicle interior to the atmosphere. The exhauster is generally mounted to a vehicle interior panel and positioned proximate to the rear bumper and the rear wheel of the vehicle. Unfortunately, due to the location of the exhauster, noise from the rear wheel and the vehicle exhaust system may enter the interior of the vehicle via the exhauster, thereby increasing the ambient noise within the interior of the vehicle.

BRIEF DESCRIPTION

In certain embodiments, a mounting assembly for a silencer of an exhauster assembly includes a mounting plate. The mounting plate has an opening configured to receive an exhauster of the exhauster assembly while the exhauster is coupled to a structure of a vehicle at least partially separately from the mounting plate. In addition, the mounting plate has a first side configured to face the structure of the vehicle and a second side configured to face the silencer. The mounting assembly also includes at least one exhauster mounting feature configured to couple the mounting plate to the exhauster. Furthermore, the mounting assembly includes a silencer mounting feature configured to couple the silencer to the mounting plate.

DRAWINGS

These and other features, aspects, and advantages of the present disclosure will become better understood when the following detailed description is read with reference to the accompanying drawings in which like characters represent like parts throughout the drawings, wherein:

FIG. 6 is a detailed perspective view of another portion of the exhauster and the mounting plate of FIG. 4.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
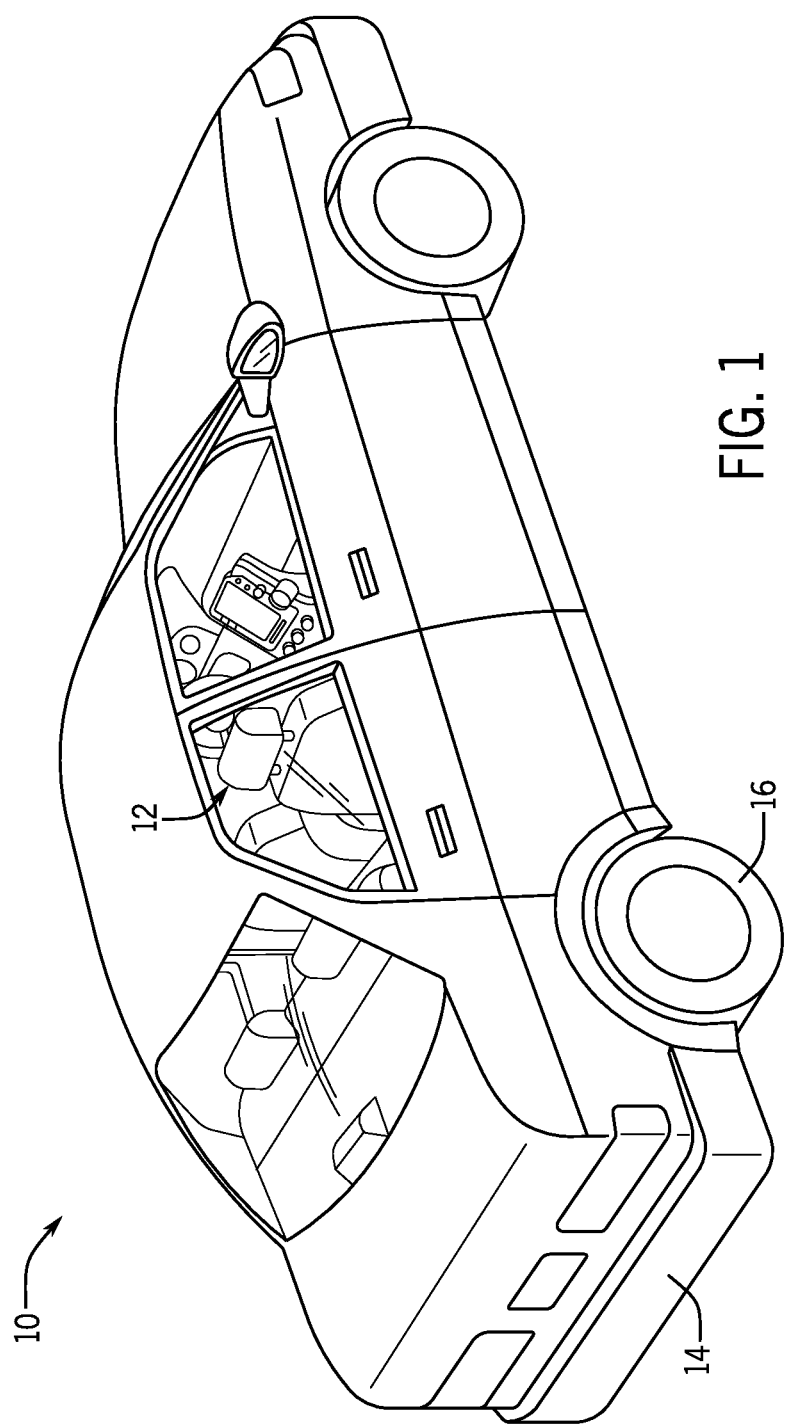
FIG. 1 is a perspective view of an embodiment of a vehicle that may include at least one exhauster assembly.

FIG. 1 is a perspective view of an embodiment of a vehicle 10 that may include at least one exhauster assembly. Each exhauster assembly includes an exhauster configured to enable air within an interior 12 of the vehicle 10 to exhaust to the atmosphere. The exhauster may include a valve configured to open while the pressure within the interior 12 of the vehicle 10 exceeds the atmospheric pressure, thereby facilitating airflow from the vehicle interior 12 to the atmosphere. In addition, the valve of the exhauster is configured to close while the pressure within the interior 12 of the vehicle 10 is less than or equal to the atmospheric pressure, thereby substantially blocking airflow from the atmosphere into the vehicle interior 12 through the exhauster. The exhauster may be mounted to a vehicle interior panel and positioned proximate to a rear bumper 14 and a rear wheel 16 of the vehicle 10. To reduce the amount of noise from the rear wheel 16 (e.g., road noise) and the vehicle exhaust system that enters the vehicle interior 12 through the exhauster, each exhauster assembly may include a silencer that partially encloses an outlet of the respective exhauster. As discussed in detail below, the silencer may block a substantial portion of soundwaves originating from a source external to the vehicle interior (e.g., the rear wheel, the vehicle exhaust system, etc.) from directly engaging the exhauster, thereby reducing the noise within the vehicle interior 12.

In certain embodiments, the exhauster assembly includes a mounting assembly configured to mount the silencer to the vehicle interior panel. In such embodiments, the mounting assembly includes a mounting plate having a first side configured to face the vehicle interior panel and a second side configured to face the silencer. The mourning plate also has an opening configured to receive the exhauster while the exhauster is coupled to the vehicle interior panel. In addition, the mounting assembly includes an exhauster mounting feature configured to couple the mounting plate to the exhauster. Furthermore, the mounting assembly includes a silencer mounting feature configured to couple the silencer to the mounting plate. The coupling between the silencer and the mounting plate, the coupling between the mounting plate and the exhauster, and the coupling between the exhauster and the vehicle interior panel couples the silencer to the vehicle interior panel. Accordingly, the silencer may be coupled to the vehicle interior panel without any modifications to the vehicle interior panel, thereby reducing the cost associated with employing a silencer to reduce the amount of noise that enters the vehicle interior through the exhauster.

Figure 2:
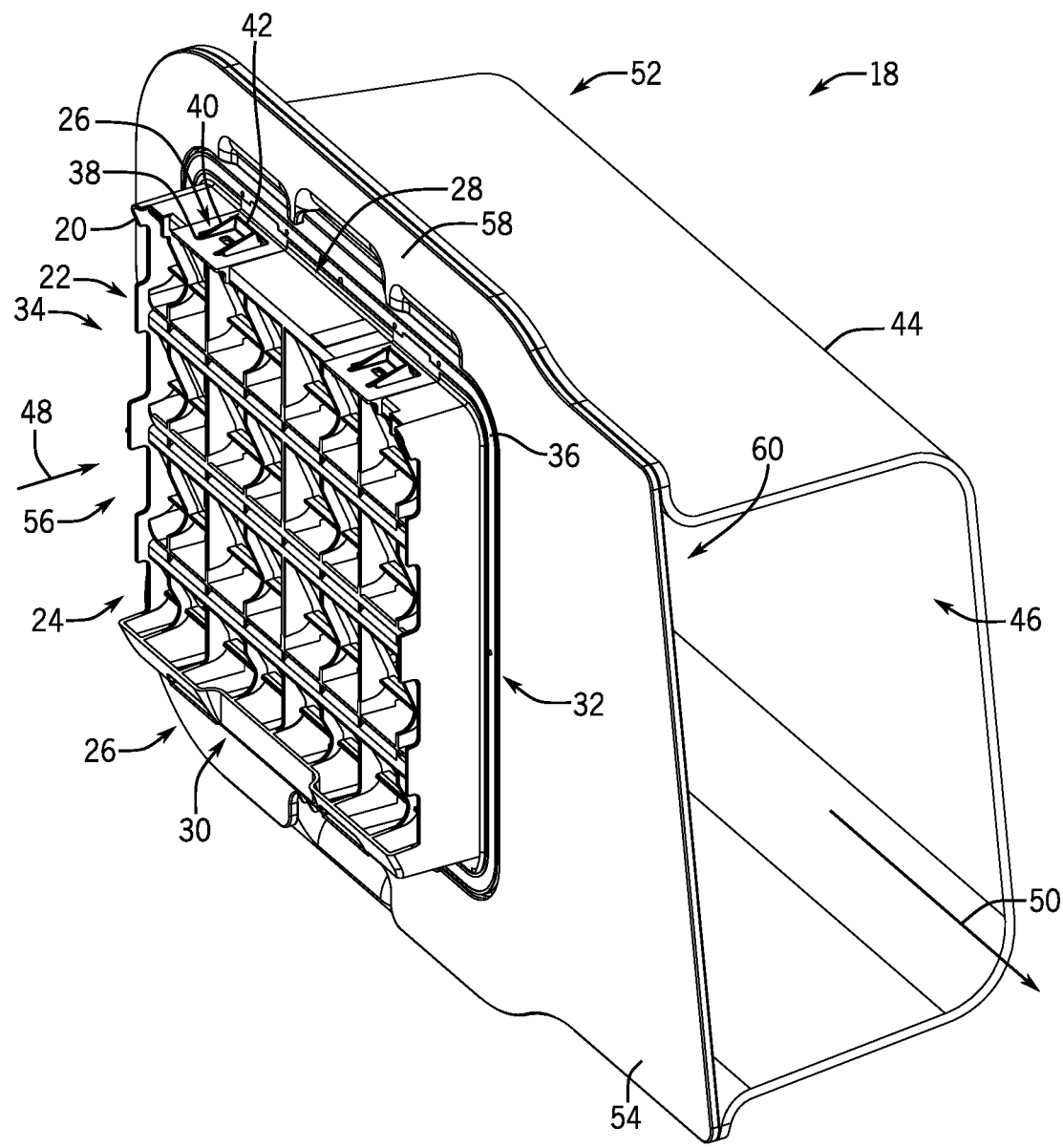
FIG. 2 is a rear perspective view of an embodiment of an exhauster assembly that may be employed within the vehicle of FIG. 1.

FIG. 2 is a rear perspective view of an embodiment of an exhauster assembly 18 that may be employed within the vehicle of FIG. 1. In the illustrated embodiment, the exhauster assembly 18 includes an exhauster 20 configured to selectively enable air to flow from the interior of the vehicle to the atmosphere. The exhauster 20 includes a valve 22 configured to open while the pressure within the interior of the vehicle exceeds the atmospheric pressure and to close while the pressure within the interior of the vehicle is less than or equal to the atmospheric pressure. In addition, the exhauster 20 has an inlet 24 configured to receive the air from the interior of the vehicle and an outlet configured to expel the air to the atmosphere. Accordingly, while the valve 22 is in the open position, air flows from the vehicle interior through the inlet 24, the valve 22, and the outlet to the atmosphere, and while the valve 22 is in the closed position, the flow of air through the exhauster 20 is substantially blocked. The valve 22 may include any suitable type of valve (e.g., flap valve, etc.) configured to control the flow of air through the exhauster 20.

As previously discussed, the exhauster 20 is configured to couple to the vehicle interior panel. As illustrated, the exhauster 20 includes panel mounting features 26 (e.g., structure mounting features) configured to couple the exhauster 20 to the vehicle interior panel. In the illustrated embodiment, the exhauster 20 includes two panel mounting features 26 positioned on a top end 28 of the exhauster 20 and two panel mounting features 26 positioned on a bottom end 30 of the exhauster 20. However, in other embodiments, more or fewer panel mounting features (e.g., 0, 1, 2, 3, 4, 5, 6, or more) may be positioned on each end of the exhauster. For example, in certain embodiments, one or more panel mounting features may be positioned on a left end 32 of the exhauster, and/or one or more panel mounting features may be positioned on a right end 34 of the exhauster. Furthermore, while the panel mounting features are positioned at the end(s) of the exhauster in the illustrated embodiment, in other embodiments, at least one panel mounting feature may be located at another suitable position on the exhauster (e.g., on the inlet side of the exhauster). In addition, while the exhauster is configured to couple to the vehicle interior panel in the illustrated embodiment, in other embodiments, the exhauster may be configured to couple to another suitable structure of the vehicle.

In the illustrated embodiment, the exhauster 20 includes a flange 36 configured to contact the vehicle interior panel. In addition, each panel mounting feature 26 includes a clip 38 that is biased radially outward from the valve 22. Each clip 38 includes an angled surface 40 and a locking surface 42. To couple the exhauster 20 to the vehicle interior panel, the exhauster 20 is aligned with an opening in the vehicle interior panel. The exhauster 20 is then moved toward the vehicle interior panel such that an edge of the panel contacts the angled surface 40 of each clip 38. Continued movement of the exhauster 20 toward the vehicle interior panel causes the vehicle interior panel to drive each clip 38 to move radially inwardly due to contact between the edge of the vehicle interior panel and the respective angled surface 40. Once the angled surface 40 moves past the edge of the vehicle interior panel, the respective clip 38 moves outwardly (e.g., to the original position) due to the radially outward bias. As a result, the vehicle interior panel is captured between the locking surface 42 of each clip 38 and the flange 36, thereby coupling the exhauster 20 to the vehicle interior panel. While each panel mounting feature includes a clip in the illustrated embodiment, in other embodiments, at least one panel mounting feature may include another suitable device configured to couple the exhauster to the vehicle interior panel (e.g., a heat stake, a fastener, another suitable type of clip, etc.). Furthermore, while the exhauster includes the panel mounting features in the illustrated embodiment, in other embodiments, at least one panel mounting feature may be separate from the exhauster (e.g., a fastener, another suitable type of clip, a heat stake, etc.).

In the illustrated embodiment, the exhauster assembly 18 includes a silencer 44 configured to partially enclose the outlet of the exhauster 20. The silencer 44 is configured to block a substantial portion of soundwaves originating from a source external to the vehicle interior (e.g., the rear wheel, the vehicle exhaust system, etc.) from directly engaging the exhauster 20, thereby reducing noise within the vehicle interior. As illustrated, the silencer 44 forms a single opening 46 (e.g., directed toward a rear of the vehicle). Air may flow from the vehicle interior through the exhauster 20 (e.g., while the valve 22 is open) along a first direction 48 (e.g., substantially perpendicular to the plane of the exhauster 20). The silencer 44 is configured to redirect the air to flow along a second direction 50 (e.g., substantially perpendicular to the first direction 48) through the opening 46. The silencer 44 may be formed from a sound absorbing material, such as a fiber composite material, which may be relatively flexible (e.g., as compared to the mounting plate). Due to the shape of the silencer 44 and the sound absorbing material which forms the silencer, a substantial portion of soundwaves originating from a source external to the vehicle interior and directed toward the exhauster may be attenuated. In addition, certain soundwaves originating from a source external to the vehicle interior that enter the opening may be substantially absorbed by the silencer, thereby substantially reducing reflection of the soundwaves toward the exhauster. As a result, the silencer 44 may substantially reduce the amount of noise from the rear wheel (e.g., road noise) and the vehicle exhaust system that enters the vehicle interior through the exhauster 20.

In the illustrated embodiment, the exhauster assembly 18 includes a mounting assembly 52 configured to couple the silencer 44 to the exhauster 20, thereby coupling the silencer 44 to the vehicle interior panel. The mounting assembly 52 includes a mounting plate 54 having an opening 56 configured to receive the exhauster 20. In addition, the mounting plate 54 has a first side 58 configured to face the vehicle interior panel and a second side 60 configured to face the silencer 44. In addition, as discussed in detail below, the mounting assembly 52 includes an exhauster mounting feature configured to couple the mounting plate 54 to the exhauster 20. The mounting assembly 52 also includes a silencer mounting feature configured to couple the silencer 44 to the mounting plate 54. The coupling between the silencer 44 and the mounting plate 54, the coupling between the mounting plate 54 and the exhauster 20, and the coupling between the exhauster 20 and the vehicle interior panel couples the silencer 44 to the vehicle interior panel. Accordingly, the silencer 44 may be coupled to the vehicle interior panel without any modifications to the vehicle interior panel, thereby reducing the cost associated with employing a silencer to reduce the amount of noise that enters the vehicle interior through the exhauster.

In the illustrated embodiment, the exhauster is configured to couple to the vehicle interior panel at least partially separately from the mounting plate. As such, the connection between the exhauster and the vehicle interior panel is at least partially separate from the connection between the exhauster and the mounting plate. Accordingly, the exhauster is not coupled to a structure of the vehicle (e.g., the vehicle interior panel) only via the mounting plate. While the mounting plate 54 is substantially flat in the illustrated embodiment, in other embodiments, the mounting plate may have any other suitable shape (e.g., corresponding to the shape of the silencer and/or the vehicle interior panel).

Figure 3:
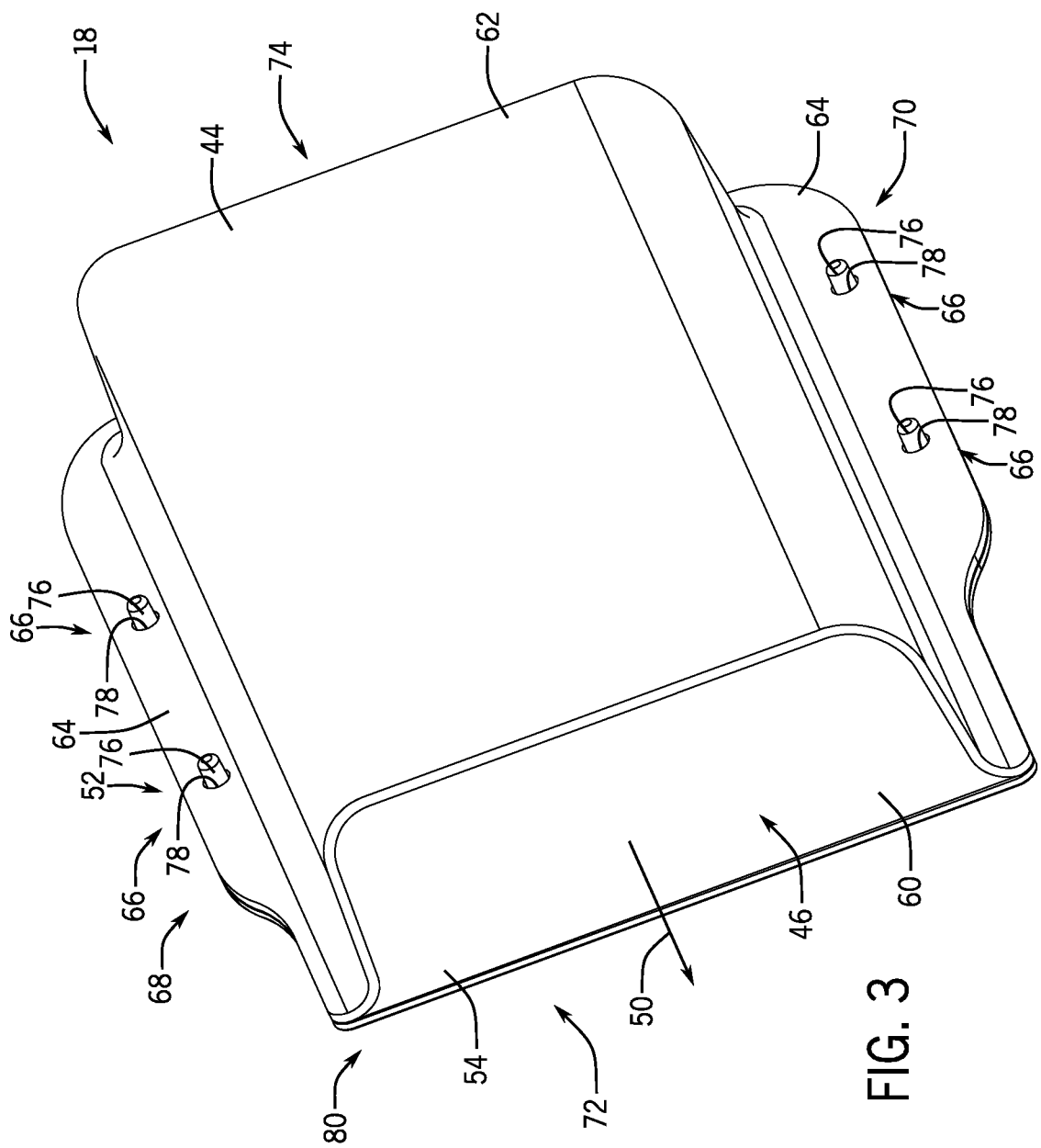
FIG. 3 is a front perspective view of the exhauster assembly of FIG. 2.

FIG. 3 is a front perspective view of the exhauster assembly 18 of FIG. 2. As illustrated, the opening 46 is formed by the silencer 44 and the mounting plate 54. While the silencer/mounting plate form a single opening in the illustrated embodiment, in other embodiments, the silencer/mounting plate may from multiple openings (e.g., an opening on a right end of the silencer and an opening on a left end of the silencer, an opening on a top end of the silencer and an opening on a bottom end of the silencer, etc.). In the illustrated embodiment, the silencer 44 has a body 62 and a flange 64. The flange 64 is configured to face the second side 60 of the mounting plate 54, and the body 62 is configured to form the opening 46. In the illustrated embodiment, the body 62 forms a substantially rectangular prism. However, in other embodiments, the body may have any other suitable shape. For example, the body may be shaped to fit within the available space of the vehicle (e.g., to avoid structural elements, cables, lines, etc.). In addition, the body may be shaped to direct reflected soundwaves away from the exhauster outlet. Furthermore, while the silencer 44 has a flange in the illustrated embodiment, in other embodiments, the flange may be omitted.

In the illustrated embodiment, the silencer 44 is configured to block soundwaves originating from a source external to the vehicle interior (e.g., the rear wheel, the vehicle exhaust system, etc.) from directly engaging the outlet of the exhauster along a direction relatively perpendicular to the plane of the exhauster (e.g., the plane of the outlet of the exhauster). As used herein, "relatively perpendicular" refers to an angle between a soundwave propagation direction and an axis perpendicular to the plane of the exhauster (e.g., the plane of the outlet of the exhauster) of less than 75 degrees, less than 70 degrees, less than 65 degrees, less than 60 degrees, less than 55 degrees, less than 50 degrees, less than 45 degrees, less than 40 degrees, less than 35 degrees, or less than 30 degrees. Accordingly, in certain embodiments, the silencer does not include an opening that enables a soundwave originating from a source external to the vehicle interior to directly engage the outlet of the exhauster along a direction relatively perpendicular to the plane of the exhauster (e.g., the plane of the outlet of the exhauster). As used herein, "directly engage" refers to engagement of a soundwave with the exhauster without the soundwave passing through and being attenuated by the silencer.

As illustrated, the mounting assembly 52 includes silencer mounting features 66 configured to couple the silencer 44 to the mounting plate 54. In the illustrated embodiment, the mounting assembly 52 includes two silencer mounting features 66 positioned at a top end 68 of the silencer/mounting plate and two silencer mounting features 66 positioned at a bottom end 70 of the silencer/mounting plate. However, in other embodiments, more or fewer silencer mounting features (e.g., 0, 1, 2, 3, 4, 5, 6, or more) may be positioned at each end of the silencer/mounting plate. For example, in certain embodiments, one or more silencer mounting features may be positioned at a left end 72 of the silencer/mounting plate, and/or one or more silencer mounting features may be positioned at a right end 74 of the silencer/mounting plate. Furthermore, while the silencer mounting features are positioned at the end(s) of the silencer/mounting plate in the illustrated embodiment, in other embodiments, at least one silencer mounting feature may be located at another suitable position (e.g., in embodiments in which the silencer does not include a flange). For example, at least one silencer mounting feature may engage the silencer at a central portion or an end portion of the body of the silencer.

In the illustrated embodiment, each silencer mounting feature 66 includes a fastener 76 extending from the second side 60 of the mounting plate 54. As illustrated, each fastener 76 extends through a respective aperture 78 within the flange 64 of the silencer 44. In certain embodiments, at least one fastener 76 may include a bolt. In such embodiments, a nut (e.g., push nut, threaded nut, etc.) may be engaged with the bolt while the bolt extends through the respective aperture, thereby coupling the silencer 44 to the mounting plate 54. Furthermore, in certain embodiments, at least one fastener 76 may include a heat stake. In such embodiments, the heat stake may be engaged with the respective aperture, and then the heat stake may be deformed (e.g., due to applied heat and pressure) such that a distal end of the heat stake expands beyond the area of the respective aperture 78, thereby coupling the silencer 44 to the mounting plate 54. While each fastener includes a bolt or a heat stake in the illustrated embodiment, in other embodiments, at least one fastener may include another suitable element configured to extend through the respective aperture in the silencer and to couple the silencer to the mounting plate. For example, the fastener may include a rod having an opening proximate to a distal end of the rod, and a pin (e.g., cotter pin) may be disposed through the opening to couple the silencer to the mounting plate. By way of further example, the fastener may include angled arms that are biased away from the another. The angled arms may move toward one another as the fastener passes through the respective aperture in the silencer due to contact between the silencer and the angled arms. Once the angled arms pass through the aperture, the angled arms may move away from one another due to the outward bias, thereby blocking removal of the silencer from the mounting plate.

Furthermore, while each silencer mounting feature includes a fastener extending from the second side of the mounting plate in the illustrated embodiment, in other embodiments, at least one silencer mounting feature may include a fastener that is separate from the mounting plate. For example, in certain embodiments, at least one silencer mounting feature may include a bolt that is separate from the mounting plate. In such embodiments, the mounting plate may include an aperture, and the bolt may extend through the aperture in the mounting plate and the respective aperture in the silencer. A nut (e.g., push nut, threaded nut, etc.) may then be engaged with the bolt to coupe the silencer to the mounting plate. In addition, in certain embodiments, at least one silencer mounting feature may include a rod having an opening proximate to a distal end of the rod. In such embodiments, the mounting plate may include an aperture, and the rod may extend through the aperture in the mounting plate and the respective aperture in the silencer. A pin (e.g., cotter pin) may be disposed through the opening to couple the silencer to the mounting plate.

In addition, in certain embodiments, the mounting assembly 52 may include another suitable type of silencer mounting feature (e.g., alone or in combination with any of the silencer mounting features disclosed above). For example, in the illustrated embodiment, the silencer 44 is coupled to the mounting plate 54 by an adhesive connection 80 (e.g., silencer mounting feature). In certain embodiments, the adhesive connection is formed by applying a liquid adhesive to the mounting plate and/or to the silencer (e.g., to the flange of the silencer) before engaging the silencer with the mounting plate. Furthermore, in certain embodiments, the adhesive connection may be formed by double-sided tape disposed between the mounting plate and the silencer (e.g., the flange of the silencer). In addition, in certain embodiments, at least one silencer mounting feature may include a clip disposed about an edge of the mounting plate and a corresponding edge of the silencer (e.g., at the flange of the silencer). Furthermore, at least one silencer mounting feature may include any other suitable device/assembly (e.g., alone or in combination with any of the mounting features disclosed above) configured to couple the silencer to the mounting plate (e.g., a magnet, a flex tie, etc.).

Figure 4:
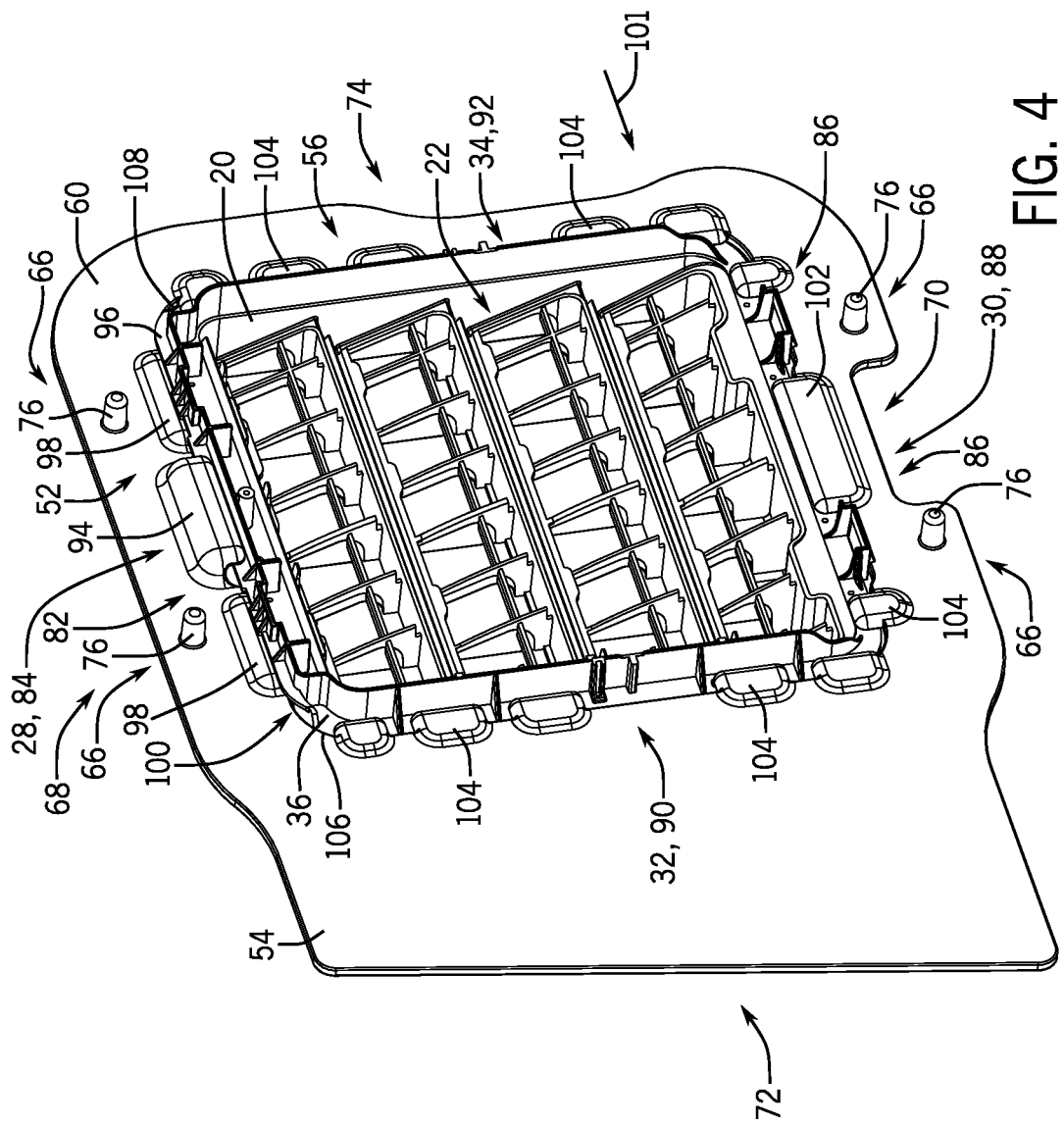
FIG. 4 is a perspective view of an exhauster and a mounting plate of the exhauster assembly of FIG. 2.

FIG. 4 is a perspective view of the exhauster 20 and the mounting plate 54 of the exhauster assembly 18 of FIG. 2. The mounting assembly 52 includes exhauster mounting features configured to couple the mounting plate 54 to the exhauster 20. In the illustrated embodiment, the exhauster mounting features include a first exhauster mounting feature 82 positioned at a top end 84 (e.g., first end) of the opening 56 and a second exhauster mounting feature 86 positioned at a bottom end 88 (e.g., second end) of the opening 56. However, in other embodiments, more or fewer exhauster mounting features (e.g., 0, 1, 2, 3, 4, 5, 6, or more) may be positioned at each end of the opening. For example, in certain embodiments, one or more exhauster mounting features (e.g., the first exhauster mounting feature) may be positioned at a left end 90 of the opening, and/or one or more exhauster mounting features (e.g., the second exhauster mounting feature) may be positioned at a right end 92 of the opening. Furthermore, while the exhauster mounting features are positioned at the end(s) of the opening in the illustrated embodiment, in other embodiments, at least one exhauster mounting feature may be located at another suitable position on the mounting plate (e.g., on the second side 60 of the mounting plate 54).

In the illustrated embodiment, the first exhauster mounting feature 82 includes a first extension 94 configured to engage a first side 96 (e.g., outlet side) of the exhauster 20 and two second extensions 98 configured to engage a second side 100 (e.g., inlet side) of the exhauster 20. Accordingly, a portion of the top end 28 of the exhauster 20 is captured by the first exhauster mounting feature. While the first exhauster mounting feature 82 includes one first extension 94 and two second extensions 98 in the illustrated embodiment, in other embodiments, the first exhauster mounting feature may include any suitable number of first extensions (e.g., 1, 2, 3, 4, 5, 6, or more) and any suitable number of second extensions (e.g., 1, 2, 3, 4, 5, 6, or more). In addition, the second exhauster mounting feature 86 includes a third extension 102 configured to engage the first side 96 (e.g., outlet side) of the exhauster 20. Accordingly, movement of the bottom end 70 of the mounting plate 54 relative to the exhauster 20 along an inward direction 101 is blocked. While the second exhauster mounting feature 86 includes a single third extension 102 in the illustrated embodiment, in other embodiments, the second exhauster mounting feature may include additional third extensions (e.g., 1, 2, 3, 4, 5, 6, or more).

In the illustrated embodiment, the mounting plate 54 has multiple locating elements 104 disposed around the opening 56 and configured to engage the exhauster 20. The locating elements 104 are configured to contact the flange 36 of the exhauster 20 to block movement of the mounting plate 54 in the inward direction 101, thereby aligning an outer edge 106 of the flange 36 with an inner edge 108 of the mounting plate 54 along the inward direction 101. As illustrated, the inner edge 108 of the mounting plate 54 forms the periphery of the opening 56. Contact between the inner edge 108 of the mounting plate 54 and the outer edge 106 of the flange 36 blocks movement of the mounting plate 54 relative to the exhauster 20 in directions perpendicular to the inward direction 101. In the illustrated embodiment, the locating elements 104 are positioned at the left end 90 of the opening 56, at the right end 92 of the opening 56, and at the bottom end 88 of the opening 56. However, in certain embodiments, one or more locating features may be positioned at the top end 84 of the opening 56, and/or the locating features may be omitted from at least one of the left end, the right end, or the top end of the opening. In the illustrated embodiment, the mounting plate 54 includes five locating elements 104 at the left end 90 of the opening 56, five locating elements 104 at the right end 92 of the opening 56, and two locating elements 104 at the bottom end 88 of the opening 56. However, in certain embodiments, the mounting plate may include any suitable number of locating elements (e.g., 0, 1, 2, 3, 4, 5, 6, 7, 8, etc.) at each end of the opening. Furthermore, in certain embodiments, the locating elements may be omitted.

The mounting plate 54 may be formed from any material suitable for mounting the silencer to the exhauster 20 (e.g., steel, aluminum, plastic, composite, etc.). For example, the mounting plate 54 may be formed from a single sheet of metal (e.g., steel, aluminum, etc.) that is stamped into the desired configuration. The thickness of the mounting plate may be particularly selected to provide sufficient support to the silencer and to fit between the silencer and the vehicle interior panel. For example, the thickness of the mounting plate may be about 0.5 mm to about 5 mm, about 1 mm to about 4 mm, about 1.5 mm to about 3 mm, or about 2 mm.

Figure 5:
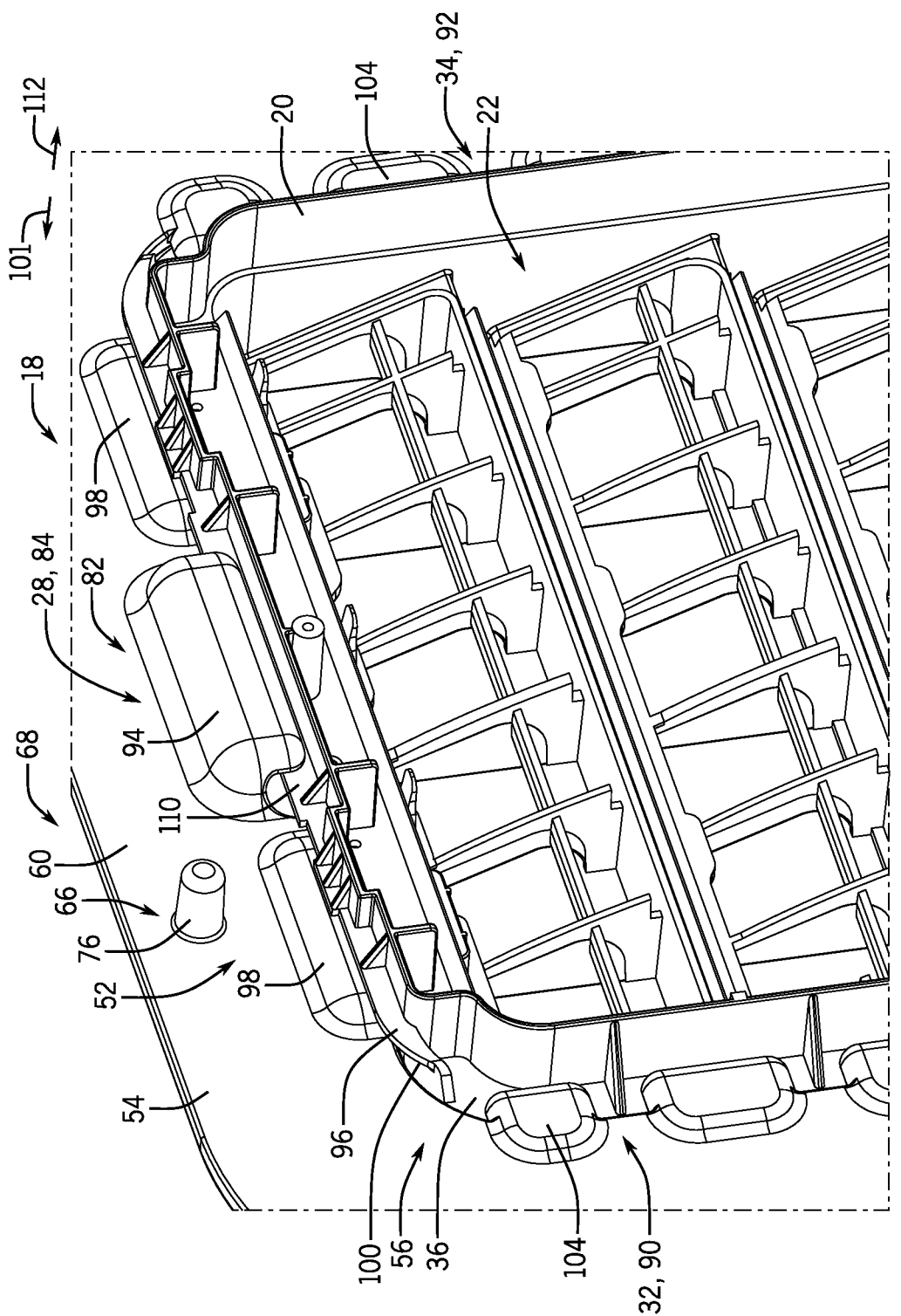
FIG. 5 is a detailed perspective view of a portion of the exhauster and the mounting plate of FIG. 4.

FIG. 5 is a detailed perspective view of a portion of the exhauster 20 and the mounting plate 54 of FIG. 4. As previously discussed, the first exhauster mounting feature 82 includes the first extension 94 configured to engage the first side 96 (e.g., outlet side) of the exhauster 20 and the two second extensions 98 configured to engage the second side 100 (e.g., inlet side) of the exhauster 20. In the illustrated embodiment, the first extension 94 and the second extensions 98 are configured to capture a lip 110 of the exhauster 20, thereby blocking movement of the top end 68 of the mounting plate 54 relative to the exhauster 20 along the inward direction 101 and along an outward direction 112. As illustrated, the lip 110 is offset from the flange 36 along the outward direction 112. Accordingly, to couple the mounting plate 54 to the exhauster, the first and second extensions may be engaged with the lip 110 while the mounting plate 54 is angled such that the locating elements 104 are spaced apart from the flange 36. The mounting plate 54 may then be rotated such that the locating elements 104 contact the flange 36, thereby aligning the inner edge 108 of the mounting plate 54 with the outer edge 106 of the flange 36 along the inward/outward direction. As discussed in detail below, with the locating elements in contact with the flange, the second exhauster mounting feature engages the exhauster. While the first and second extensions are configured to capture the lip of the exhauster in the illustrated embodiment, in other embodiments, the first and second extensions may be configured to capture another suitable portion of the exhauster.

While the first exhauster mounting feature 82 includes one first extension 94 and two second extensions 98 in the illustrated embodiment, in other embodiments, the first exhauster mounting feature may include any suitable number of first extensions (e.g., 1, 2, 3, 4, 5, 6, or more) and any suitable number of second extensions (e.g., 1, 2, 3, 4, 5, 6, or more). In addition, while the first extension 94 is positioned between the second extensions 98 in the illustrated embodiment, in other embodiments, the first and second extensions may be positioned in any suitable arrangement along the top end of the opening. Furthermore, while the first exhauster mounting feature includes the first and second extensions in the illustrated embodiment, in other embodiment, the first exhauster mounting feature may include other suitable mounting device(s)/element(s) (e.g., alone or in combination with the first and second extensions). For example, in certain embodiments, the first exhauster mounting feature may include one or more apertures in the mounting plate configured to receive respective fastener(s) (e.g., bolt(s), heat stake(s), etc.) that couple the mounting plate to the exhauster. By way of example, one or more heat stakes (e.g., of the first exhauster mounting feature) may extend from the first side of the exhauster (e.g., at the top end of the exhauster). The heat stake(s) may be engaged with the aperture(s) in the mounting plate, and then each heat stake may be deformed (e.g., due to applied heat and pressure) such that a distal end of the heat stake expands beyond the area of the aperture, thereby coupling the mounting plate to the exhauster. Furthermore, in certain embodiments, the first exhauster mounting feature may include one or more other suitable mounting devices/elements (e.g., clip(s), magnet(s), fastener(s), adhesive connection(s), welded connection(s), press-fit connection(s), etc.) configured to couple the mounting plate to the exhauster (e.g., alone or in combination with any of the mounting devices/elements disclosed above, such as the first and second extensions).

FIG. 6 is a detailed perspective view of another portion of the exhauster 20 and the mounting plate 54 of FIG. 4. As previously discussed, the second exhauster mounting feature 86 includes the third extension 102 configured to engage the first side 96 (e.g., outlet side) of the exhauster 20. In the illustrated embodiment, the third extension 102 is configured to engage the first side 96 (e.g., outlet side) of the flange 36, thereby blocking movement of the bottom end 70 of the mounting plate 54 relative to the exhauster along the inward direction 101. While the third extension 102 is configured to engage the flange 36 in the illustrated embodiment, in other embodiments, the third extension may be configured to engage any other suitable portion of the exhauster.

In the illustrated embodiment, the exhauster 20 includes a third exhauster mounting feature 114 configured to block movement of the mounting plate 54 relative to the exhauster 20 along the outward direction 112. The third exhauster mounting feature 114 includes two clip 116, in which each clip 116 is biased radially outward from the valve 22. As illustrated, each clip 116 includes an angled surface 118 and a locking surface 120. To couple the mounting plate 54 to the exhauster 20, the bottom end 70 of the mounting plate 54 is moved toward the exhauster 20 along the inward direction 101, such that the inner edge 108 of the mounting plate 54 contacts the angled surface 118 of each clip 116. Continued movement of the bottom end 70 of the mounting plate 54 along the inward direction 101 causes the mounting plate 54 to drive each clip 116 to move radially inwardly due to contact between the inner edge 108 of the mounting plate 54 and the respective angled surface 118. Once the inner edge 108 of the mounting plate 54 moves past the angled surface 118, the respective clip 116 moves radially outwardly (e.g., to the original position) due to the radially outward bias. As a result, movement of the mounting plate 54 relative to the exhauster 20 along the outward direction 112 is blocked by contact between the mounting plate 54 and the locking surface 120 of each clip 116. Accordingly, the third exhauster mounting feature 114 and the second exhauster mounting feature 86 cooperate to couple the bottom end 70 of the mounting plate 54 to the exhauster 20. While the third exhauster mounting feature 114 includes two clips 116 in the illustrated embodiment, in other embodiments, the third exhauster mounting feature may include more or fewer clips (e.g., 1, 2, 3, 4, or more). Furthermore, while the third exhauster mounting feature includes clips in the illustrated embodiment, in other embodiments, the third exhauster mounting feature may include any other suitable device(s) (e.g., heat stake(s), fastener(s), other suitable type(s) of clip(s), etc.) configured to couple the mounting plate to the exhauster (e.g., alone or in combination with the clip(s) 116). Furthermore, while the exhauster includes the third exhauster mounting feature in the illustrated embodiment, in other embodiments, at least certain element(s) of the third exhauster mounting feature may be separate from the exhauster (e.g., fastener(s), other suitable type(s) of clip(s), heat stake(s) extending from the mounting plate, etc.). In addition, while the mounting assembly 52 includes three exhauster mounting features in the illustrated embodiment, in other embodiments, the mounting assembly may include more or fewer exhauster mounting features.

As previously discussed, to couple the mounting plate 54 to the exhauster 20, the first and second extensions may be engaged with the lip of the exhauster while the mounting plate 54 is angled such that the locating elements 104 are spaced apart from the flange 36. The mounting plate 54 may then be rotated such that the locating elements 104 contact the flange 36, thereby aligning the inner edge 108 of the mounting plate 54 with the outer edge 106 of the flange 36 along the inward/outward direction. With the locating elements in contact with the flange, the third extension 102 engages the flange 36, and the clips 116 of the third exhauster mounting feature 114 engage the mounting plate 54, thereby blocking movement of the mounting plate 54 relative to the exhauster 20 along the inward direction 101 and along the outward direction 112.

While the second exhauster mounting feature 86 includes a single third extension 102 in the illustrated embodiment, in other embodiments, the second exhauster mounting feature may include any suitable number of third extensions (e.g., 1, 2, 3, 4, 5, 6, or more). Furthermore, while the second exhauster mounting feature includes the third extension in the illustrated embodiment, in other embodiments, the second exhauster mounting feature may include other suitable mounting device(s)/element(s) (e.g., alone or in combination with the third extension). For example, in certain embodiments, the second exhauster mounting feature may include one or more apertures in the mounting plate configured to receive respective fastener(s) (e.g., bolt(s), heat stake(s), etc.) that couple the mounting plate to the exhauster. By way of example, one or more heat stakes (e.g., of the second exhauster mounting feature) may extend from the first side of the exhauster (e.g., at the bottom end of the exhauster). The heat stake(s) may be engaged with the aperture(s) in the mounting plate, and then each heat stake may be deformed (e.g., due to applied heat and pressure) such that a distal end of the heat stake expands beyond the area of the aperture, thereby coupling the mounting plate to the exhauster. Furthermore, in certain embodiments, the second exhauster mounting feature may include one or more other suitable mounting devices/elements (e.g., clip(s), magnet(s), fastener(s), adhesive connection(s), welded connection(s), press-fit connection(s), etc.) configured to couple the mounting plate to the exhauster (e.g., alone or in combination with any of the mounting devices/elements disclosed above, such as the third extension).

In certain embodiments, the exhauster assembly may be coupled to the vehicle interior panel as a single unit. For example, the exhauster may be coupled to the mounting plate via the exhauster mounting feature(s). The silencer may then be coupled to the mounting plate via the silencer mounting feature(s), thereby forming the exhauster assembly. Next, the exhauster assembly may be coupled to the vehicle interior panel via the panel mounting feature(s) of the exhauster. However, in other embodiments, the exhauster assembly may be formed on the vehicle interior panel. For example, the exhauster may be coupled to the vehicle interior panel via the panel mounting feature(s). Next, the mounting plate may be coupled to the exhauster via the exhauster mounting feature(s). The silencer may then be coupled to the mounting plate via the silencer mounting feature(s), thereby forming the exhauster assembly on the vehicle interior panel. In further embodiments, the mounting plate may be coupled to the exhauster, the exhauster may then be coupled to the vehicle interior panel, and then the silencer may be coupled to the mounting plate.

Furthermore, in certain embodiments, an exhauster mounting feature may include the flange of the exhauster. For example, the dimensions of the opening in the mounting plate may be smaller than the dimensions of the flange. As such, the mounting plate may be captured between the vehicle interior panel and the flange while the exhauster is coupled to the vehicle interior panel, thereby coupling the mounting plate to the exhauster. By way of example, prior to coupling the exhauster to the vehicle interior panel, the inlet side of the exhauster may be disposed through the opening in the mounting plate. The mounting plate may then be coupled to the vehicle interior panel via the panel mounting feature(s). Contact between the first side of the mounting plate and the vehicle interior panel and contact between the second side of the mounting plate and the flange may block movement of the mounting plate relative to the exhauster along the inward direction and along the outward direction, thereby coupling the mounting plate to the exhauster (e.g., without any other exhauster mounting features).

As used herein, the terms "top" and "bottom"; "left" and "right"; "upward" and "downward"; "above" and "below"; "inward" and "outward"; and other like terms refer to relative positions to one another and are not intended to denote a particular direction or spatial orientation. Furthermore, while only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A mounting assembly for a silencer of an exhauster assembly, comprising:
    a mounting plate having an opening configured to receive an exhauster of the exhauster assembly while the exhauster is coupled to a structure of a vehicle at least partially separately from the mounting plate, wherein the mounting plate has a first side configured to face the structure of the vehicle and a second side configured to face the silencer;
    at least one exhauster mounting feature configured to couple the mounting plate to the exhauster, wherein the at least one exhauster mounting feature comprises a first exhauster mounting feature and a second exhauster mounting feature, the first exhauster mounting feature is formed on the mounting plate and positioned at a first end of the opening, and the second exhauster mounting feature is formed on the mounting plate and positioned at a second end of the opening, opposite the first end; and
    a silencer mounting feature configured to couple the silencer to the mounting plate.

2. The mounting assembly of claim 1, wherein the first exhauster mounting feature comprises a first extension configured to engage a first side of the exhauster and a second extension configured to engage a second side of the exhauster, opposite the first side of the exhauster.

3. The mounting assembly of claim 1, wherein the second exhauster mounting feature comprises a third extension configured to engage a first side of the exhauster.

4. The mounting assembly of claim 1, wherein the silencer mounting feature comprises a fastener extending from the mounting plate.

5. The mounting assembly of claim 4, wherein the fastener comprises a bolt or a heat stake.

6. The mounting assembly of claim 1, wherein the mounting plate comprises a plurality of locating elements disposed around the opening and configured to engage the exhauster.

7. An exhauster assembly for a vehicle, comprising:
    a silencer configured to partially enclose an outlet of an exhauster;
    a mounting plate having an opening configured to receive the exhauster while the exhauster is coupled to a structure of the vehicle at least partially separately from the mounting plate, wherein the mounting plate has a first side configured to face the structure of the vehicle and a second side configured to face the silencer;
    at least one exhauster mounting feature configured to couple the mounting plate to the exhauster; and
    a silencer mounting feature configured to couple the silencer to the mounting plate.

8. The exhauster assembly of claim 7, wherein the silencer mounting feature comprises a fastener, an adhesive connection, or a combination thereof.

9. The exhauster assembly of claim 7, wherein the silencer is configured to block soundwaves originating from a source external to an interior of the vehicle from directly engaging the outlet of the exhauster along a direction relatively perpendicular to a plane of the outlet of the exhauster.

10. The exhauster assembly of claim 7, wherein the at least one exhauster mounting feature comprises a first exhauster mounting feature and a second exhauster mounting feature, the first exhauster mounting feature is formed on the mounting plate and positioned at a first end of the opening, and the second exhauster mounting feature is formed on the mounting plate and positioned at a second end of the opening, opposite the first end.

11. The exhauster assembly of claim 10, wherein the first exhauster mounting feature comprises a first extension configured to engage a first side of the exhauster and a second extension configured to engage a second side of the exhauster, opposite the first side of the exhauster.

12. The exhauster assembly of claim 10, wherein the second exhauster mounting feature comprises a third extension configured to engage a first side of the exhauster.

13. An exhauster assembly for a vehicle, comprising:
- an exhauster configured to selectively enable air to flow from an interior of the vehicle to an atmosphere, wherein the exhauster comprises an inlet configured to receive the air from the interior of the vehicle and an outlet configured to expel the air to the atmosphere, and the exhauster is configured to couple to a structure of the vehicle;
- a silencer configured to partially enclose the outlet of the exhauster;
- a mounting plate having an opening configured to receive the exhauster, wherein the mounting plate has a first side configured to face the structure of the vehicle and a second side configured to face the silencer, and the exhauster is configured to couple to the structure of the vehicle at least partially separately from the mounting plate;
- at least one exhauster mounting feature configured to couple the mounting plate to the exhauster; and
- a silencer mounting feature configured to couple the silencer to the mounting plate.

14. The exhauster assembly of claim 13, wherein the at least one exhauster mounting feature comprises a first exhauster mounting feature, a second exhauster mounting feature, and a third exhauster mounting feature, the first exhauster mounting feature is formed on the mounting plate and positioned at a first end of the opening, the second exhauster mounting feature is formed on the mounting plate and positioned at a second end of the opening, opposite the first end, and the third exhauster mounting feature is formed on the exhauster and positioned at the second end of the opening.

15. The exhauster assembly of claim 14, wherein the third exhauster mounting feature comprises a clip configured to engage the mounting plate.

16. The exhauster assembly of claim 13, wherein the silencer mounting feature comprises a fastener, an adhesive connection, or a combination thereof.

17. The exhauster assembly of claim 13, wherein the silencer is configured to block soundwaves originating from a source external to the interior of the vehicle from directly engaging the outlet of the exhauster along a direction relatively perpendicular to a plane of the outlet of the exhauster.

18. The exhauster assembly of claim 13, wherein the mounting plate comprises a plurality of locating elements disposed around the opening and configured to engage the exhauster.

19. The exhauster assembly of claim 13, wherein the exhauster comprises a structure mounting feature configured to couple the exhauster to the structure of the vehicle.

* * * * *